(12) United States Patent
Takata

(10) Patent No.: US 7,703,964 B2
(45) Date of Patent: Apr. 27, 2010

(54) ILLUMINATION DEVICE AND DISPLAY APPARATUS INCLUDING THE SAME

(75) Inventor: Yoshiki Takata, Suzuka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/738,565

(22) Filed: Apr. 23, 2007

(65) Prior Publication Data

US 2007/0189006 A1 Aug. 16, 2007

Related U.S. Application Data

(63) Continuation of application No. 10/977,827, filed on Oct. 29, 2004, now Pat. No. 7,303,325.

(30) Foreign Application Priority Data

Nov. 18, 2003 (JP) ............................. 2003-388205

(51) Int. Cl.
*F21V 7/04* (2006.01)
(52) U.S. Cl. ................... 362/558; 362/614; 362/70; 362/245
(58) Field of Classification Search ............... 362/561, 362/614, 29, 30, 225, 245, 246, 558; 349/70, 349/64
See application file for complete search history.

(56) References Cited

U.S. PATENT DOCUMENTS

| | | | |
|---|---|---|---|
| 5,235,497 A | 8/1993 | Costa | |
| 5,276,504 A * | 1/1994 | Zwirner et al. | 356/638 |
| 5,434,762 A | 7/1995 | Shemitz | |
| 5,479,328 A * | 12/1995 | Lee et al. | 362/216 |
| 5,975,722 A | 11/1999 | Van Duijneveldt | |
| 6,050,704 A | 4/2000 | Park | |
| 6,331,064 B1 * | 12/2001 | Nishiyama et al. | 362/260 |
| 6,447,133 B1 | 9/2002 | Eschke et al. | |
| 6,491,411 B2 | 12/2002 | Itoh | |
| 6,654,088 B2 | 11/2003 | Morishita et al. | |
| 6,714,185 B2 * | 3/2004 | Kim et al. | 345/102 |
| 6,741,307 B2 | 5/2004 | Matsunaga et al. | |
| 6,778,235 B2 | 8/2004 | Takahashi et al. | |
| 6,798,150 B2 | 9/2004 | Moon | |
| 6,857,759 B2 | 2/2005 | Lee et al. | |

(Continued)

FOREIGN PATENT DOCUMENTS

JP 03-259177 A 11/1991

(Continued)

OTHER PUBLICATIONS

Y. Takata; "Illumination and Display Device Using the Same"; U.S. Appl. No. 11/002,154, filed on Dec. 1, 2004.

(Continued)

*Primary Examiner*—Jong-Suk (James) Lee
*Assistant Examiner*—Julie A Shallenberger
(74) *Attorney, Agent, or Firm*—Keating & Bennett, LLP

(57) ABSTRACT

An illumination device for a display apparatus provided on a rear side of a display panel of the display apparatus includes a plurality of rod-like light sources arranged substantially parallel to each other; and a light scattering member for scattering light, the light scattering member being provided between two adjacent rod-like light sources among the plurality of rod-like light sources.

22 Claims, 7 Drawing Sheets

U.S. PATENT DOCUMENTS

| | | | |
|---|---|---|---|
| 6,870,525 | B2 | 3/2005 | Kawabata et al. |
| 6,939,020 | B2 | 9/2005 | Lim |
| 6,995,815 | B2* | 2/2006 | Tsai ............................ 349/70 |
| 7,106,394 | B2 | 9/2006 | Ono et al. |
| 7,131,742 | B2 | 11/2006 | Moon |
| 2002/0030993 | A1* | 3/2002 | Itoh ........................... 362/246 |
| 2003/0026085 | A1 | 2/2003 | Ueda et al. |
| 2003/0035283 | A1 | 2/2003 | Lim |
| 2003/0210222 | A1 | 11/2003 | Ogiwara et al. |
| 2003/0218877 | A1 | 11/2003 | Moon |
| 2004/0012971 | A1 | 1/2004 | Tsai et al. |
| 2004/0070965 | A1 | 4/2004 | Lin |
| 2004/0114395 | A1* | 6/2004 | Chan et al. .................. 362/560 |
| 2004/0119418 | A1 | 6/2004 | Moon |
| 2004/0140773 | A1 | 7/2004 | Moon |
| 2004/0189892 | A1 | 9/2004 | Ono et al. |
| 2005/0024867 | A1 | 2/2005 | Witham et al. |
| 2005/0110921 | A1* | 5/2005 | Jeon ............................ 349/64 |
| 2005/0117322 | A1 | 6/2005 | Takata |
| 2005/0122741 | A1 | 6/2005 | Takata |
| 2005/0135118 | A1 | 6/2005 | Takata |
| 2005/0195619 | A1* | 9/2005 | Tseng ......................... 362/561 |
| 2005/0237752 | A1* | 10/2005 | Ono ............................ 362/373 |

FOREIGN PATENT DOCUMENTS

| | | |
|---|---|---|
| JP | 04-143725 A | 5/1992 |
| JP | 04-172319 A | 6/1992 |
| JP | 05-257002 A | 10/1993 |
| JP | 06-067176 A | 3/1994 |
| JP | 08-194650 A | 7/1996 |
| JP | 09-281339 A | 10/1997 |
| JP | 10-039808 A | 2/1998 |
| JP | 10-067828 A | 3/1998 |
| JP | 10-143089 A | 5/1998 |
| JP | 10-186328 A | 7/1998 |
| JP | 3069624 U | 6/2000 |
| JP | 2000-310776 A | 11/2000 |
| JP | 2001-174813 A | 6/2001 |
| JP | 2001-210126 A | 8/2001 |
| JP | 2002-122863 A | 4/2002 |
| JP | 2003-031003 A | 1/2003 |
| JP | 2003-084277 A | 3/2003 |
| JP | 2003-215585 A | 7/2003 |
| JP | 2003-233071 A | 8/2003 |
| JP | 2004-296298 A | 10/2004 |

OTHER PUBLICATIONS

Y. Takata; "Optical Material, Optical Element, Illumination and Display Device"; U.S. Appl. No. 11/012,738, filed on Dec. 15, 2004.
Official communication issued in the corresponding Korean Application No. 10-2004-0093904, mailed on Jun. 30, 2006.
Official communication issued in the corresponding Korean Application No. 10-2004-0093904, mailed on Dec. 14, 2006.
Y. Takata; "Illumination Device and Display Apparatus Including the Same"; U.S. Appl. No. 10/977,827, filed on Nov. 2, 2004.
Official Communication issued in the corresponding Chinese Patent Application No. 2004101013768, mailed on Feb. 24, 2006.
Official Communication issued in the corresponding Taiwanese Patent Application No. 093139400, mailed on Apr. 10, 2006.
Official Communication issued in the corresponding Japanese Patent Application No. 2004-323857, mailed on Oct. 17, 2006.
Official communication issued in the corresponding European Patent Application No. 04257519.1, mailed on Jun. 23, 2005.
Official communication issued in the corresponding European Patent Application No. 04257519.1, mailed on Mar. 29, 2005.
Takata; "Illuminator and Display Device Using the Same," U.S. Appl. No. 11/954,761, filed on Dec. 12, 2007.
Official communication issued in the counterpart Japanese Application No. 2003-388205, mailed on Apr. 17, 2007.

* cited by examiner

ILLUMINATION DEVICE AND DISPLAY APPARATUS INCLUDING THE SAME

BACKGROUND OF THE INVENTION

1. Field of the Invention

The present invention relates to an illumination device and a display apparatus including the same; and specifically to an illumination device provided on a rear side of a display panel and usable as a backlight of a display apparatus, and a display apparatus including such an illumination device.

2. Description of the Related Art

Liquid crystal display apparatuses are widely used for electronic office equipment, vehicle-mountable TVs, monitors of video cameras and the like owing to the features of being light weight, thin and low in power consumption. Unlike self-luminous display apparatuses including CRTs (cathode-ray tubes), PDPs (plasma display panels) and EL (electroluminescence) units, liquid crystal display apparatuses use a liquid crystal display device which is not self-luminous. Therefore, transmissive liquid crystal display apparatuses include a planar illumination device referred to as a backlight provided on a rear side of the liquid crystal device. The amount of illumination light from the backlight, which is to be transmitted through the liquid crystal display device, is controlled by the liquid crystal display device pixel by pixel, and thus images are displayed.

Backlights are roughly classified into "direct"-type backlights and "edge light"-type backlights. A direct-type backlight includes a plurality of rod-like light sources such as fluorescent tubes directly below the liquid crystal display device. An edge light-type backlight includes a light source located at an end of a lightguide plate, and the light from the light source is guided to the liquid crystal display device by the lightguide plate.

FIG. 12 schematically shows a general structure of a direct-type backlight. In FIG. 12, a direct-type backlight 40 is provided on a rear side of a transmissive liquid crystal display panel 48. The backlight 40 includes a plurality of fluorescent tubes 41 arranged at a prescribed interval, a case 43 for accommodating the plurality of fluorescent tubes 41, and an optical sheet (for example, a diffusion sheet or a prism sheet) 45 located between the plurality of fluorescent tubes 41 and the liquid crystal display panel 48. The direct-type backlight 40 allows the luminance to be easily controlled by adjusting the number of the fluorescent tubes 41 used as the light sources. (Hereinafter, the fluorescent tubes 41 will also be referred to as the "light sources 41".) Therefore, the direct-type backlight 40 can easily realize high luminance and so are often used for large-sized liquid crystal display apparatuses.

However, the direct-type backlight 40 has the following drawback. The light sources 41 exist discretely, i.e., at an interval directly, below the liquid crystal display panel 48. Therefore, the luminance is higher in areas of the liquid crystal display panel 48 right above the light sources 41 and is lower in areas of the liquid crystal display panel 48 corresponding to regions between the light sources 41. This results in uneven luminance.

The degree of unevenness of luminance is lower as distance A between the light sources 41 and the liquid crystal display panel 48 is longer, and also as distance B between two adjacent light sources 41 is shorter. In other words, the degree of unevenness of luminance is lower as the ratio R of distance B with respect to distance A (i.e., B/A) is smaller, and is higher as the ratio R is larger. This means that the degree of unevenness of luminance can be decreased by increasing distance A between the light sources 41 and the liquid crystal display panel 48, or by increasing the number of the light sources 41 and thus decreasing distance B between two adjacent light sources 41. However, these solutions also have the following problems.

In the case where distance A between the light sources 41 and the liquid crystal display panel 48 is increased, the thickness of the backlight 40 and so the thickness of the display apparatus including the backlight 40 are increased. This lowers the product value of the backlight 40 and the display apparatus. In the case where the number of the light sources 41 is increased so as to decrease distance B between two adjacent light sources 41, the production cost of the backlight 40 and the display apparatus including the backlight 40 is raised. This also lowers the product value of the backlight 40 and the display apparatus.

Japanese Laid-Open Patent Publication No. 2002-122863 discloses a backlight 50 shown in FIG. 13. The backlight 50 includes light-reflective projections 52 having a triangular cross-section, which are provided between light sources 51. With such a structure, the backlight 50 suppresses the unevenness of luminance.

Japanese Laid-Open Patent Publication No. 2000-310776 discloses a backlight 60 shown in FIG. 14. The backlight 60 includes an assisting light source 64 including a primary light source 62 and a lightguide plate 63. The assisting light source 64 is provided on the opposite side from the liquid crystal display panel with respect to the light sources 61. With such a structure, the backlight 60 suppresses the unevenness of luminance. Japanese Laid-Open Patent Publication No. 2000-310776 also describes that the unevenness of luminance can be further suppressed by forming a scattering dot pattern as follows. The scattering dot pattern is formed on a surface of the lightguide plate 63 in order to guide outside the light which is emitted from the primary light source 62 and incident on the lightguide plate 63. The dots are formed sparsely in areas right below the light sources 61 and densely in areas corresponding to regions between the light sources 61. With this structure, the luminance of the light going out from the lightguide plate 63 can be controlled such that the luminance of the light from the areas right below the light sources 61 is lower and the luminance of the light from the areas corresponding to the regions between the light sources 61 is higher. Thus, the unevenness of luminance can be further suppressed.

The present inventor studied in detail the relationship between the structure of the backlight and the degree of unevenness of luminance from various perspectives. As a result, it was found that the unevenness of luminance is not sufficiently suppressed either by the backlight disclosed in Japanese Laid-Open Patent Publication No. 2002-122863 or by the backlight disclosed in Japanese Laid-Open Patent Publication No. 2000-310776. More specifically, with the backlights disclosed in Japanese Laid-Open Patent Publications Nos. 2002-122863 and 2000-310776, the degree of unevenness of luminance is sufficiently decreased in the "front" direction (i.e., the direction normal to the display screen of the display apparatus) but is not sufficiently decreased in "oblique" directions (i.e., directions angled with respect to the direction normal to the display screen of the display apparatus).

SUMMARY OF THE INVENTION

The present invention, in light of the above-described problems, has an objective of providing an illumination device capable of sufficiently suppressing the unevenness of luminance and preferably usable as a direct-type backlight, and a display apparatus including such an illumination device.

According to one aspect of the invention, an illumination device for a display apparatus provided on a rear side of a display panel of the display apparatus includes a plurality of rod-like light sources arranged substantially parallel to each other; and a light scattering member for scattering light, the light scattering member being provided between two adjacent rod-like light sources among the plurality of rod-like light sources. The above-described objective is achievable by this.

In one preferable embodiment of the invention, the light scattering member is located at substantially the middle between the two adjacent rod-like light sources.

In one preferable embodiment of the invention, the light scattering member is rod-like.

In one preferable embodiment of the invention, the light scattering member is located substantially parallel to the plurality of rod-like light sources.

In one preferable embodiment of the invention, the central axis of the light scattering member is located substantially in the same plane as the central axes of the plurality of rod-like light sources.

In one preferable embodiment of the invention, the light scattering member has substantially the same outer diameter as the outer diameter of each of the plurality of rod-like light sources.

In one preferable embodiment of the invention, a cross-section of the light scattering member which is vertical to a longitudinal direction thereof has substantially the same shape as the shape of a cross-section of each of the plurality of rod-like light sources which is vertical to a longitudinal direction thereof.

In one preferable embodiment of the invention, a cross-section of the light scattering member which is vertical to a longitudinal direction thereof is generally circular.

In one preferable embodiment of the invention, each of the plurality of rod-like light sources is a fluorescent tube.

According to another aspect of the invention, an illumination device for a display apparatus provided on a rear side of a display panel of the display apparatus includes at least one light source including a plurality of rod-like sections arranged substantially parallel to each other and a bent section for connecting two adjacent rod-like sections among the plurality of rod-like sections; and a light scattering member for scattering light, the light scattering member being provided between two adjacent rod-like sections among the plurality of rod-like sections. The above-described objective is achievable by this.

In one preferable embodiment of the invention, the light scattering member is located at substantially the middle between the two adjacent rod-like sections.

In one preferable embodiment of the invention, the light scattering member is rod-like.

In one preferable embodiment of the invention, the light scattering member is located substantially parallel to the plurality of rod-like sections.

In one preferable embodiment of the invention, the central axis of the light scattering member is located substantially in the same plane as the central axes of the plurality of rod-like sections.

In one preferable embodiment of the invention, the light scattering member has substantially the same outer diameter as the outer diameter of each of the plurality of rod-like sections.

In one preferable embodiment of the invention, a cross-section of the light scattering member which is vertical to a longitudinal direction thereof has substantially the same shape as the shape of a cross-section of each of the plurality of rod-like sections which is vertical to a longitudinal direction thereof.

In one preferable embodiment of the invention, a cross-section of the light scattering member which is vertical to a longitudinal direction thereof is generally circular.

In one preferable embodiment of the invention, the at least one light source is at least one fluorescent tube.

In one preferable embodiment of the invention, the light scattering member includes a matrix formed of a resin material and particles dispersed in the matrix, and the matrix and the particles have different refractive indices from each other.

According to still another aspect of the invention, a display apparatus includes a display panel for performing display by modulating light; and any one of the above-described illumination device which is provided at a rear side of the display panel. The above-described objective is achievable by this.

In one preferable embodiment of the invention, the display panel is a liquid crystal display panel including a pair of substrates and a liquid crystal layer provided between the pair of substrates.

In an illumination device according to the present invention, a light scattering member for scattering light is located between two adjacent rod-like light sources (or rod-like sections), and therefore acts as a pseudo light source. Thus, an optical system, which is equivalent to an optical system including a larger number of rod-like light sources (or rod-like sections) arranged at a shorter interval, can be realized. As a result, the degree of unevenness of luminance (brightness) can be decreased both in the front direction and in the oblique directions.

An illumination device according to the present invention is preferably usable as a backlight of a display apparatus such as a liquid crystal display apparatus or the like. A display apparatus including the illumination device according to the present invention offers high quality display.

DESCRIPTION OF THE PREFERRED EMBODIMENTS

Hereinafter, the present invention will be described by way of examples with reference to the attached drawings. The present invention is not limited to the following examples.

First Preferred Embodiment

Figure 1:
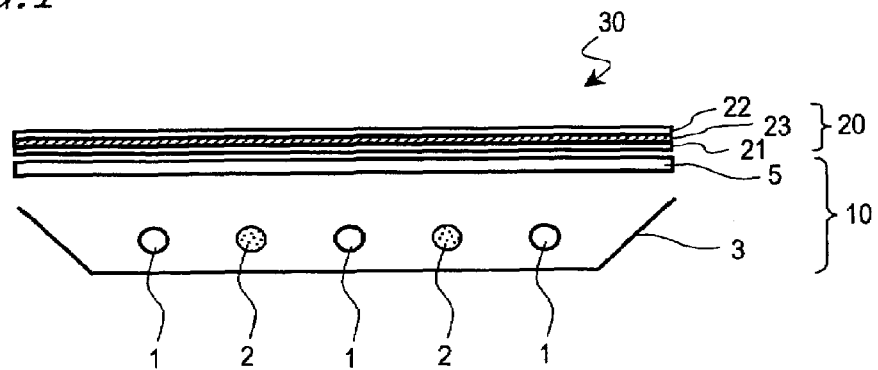
FIG. 1 is a cross-sectional view schematically illustrating a liquid crystal display apparatus 30 including an illumination device 10 according to the present invention.
Figure 2:
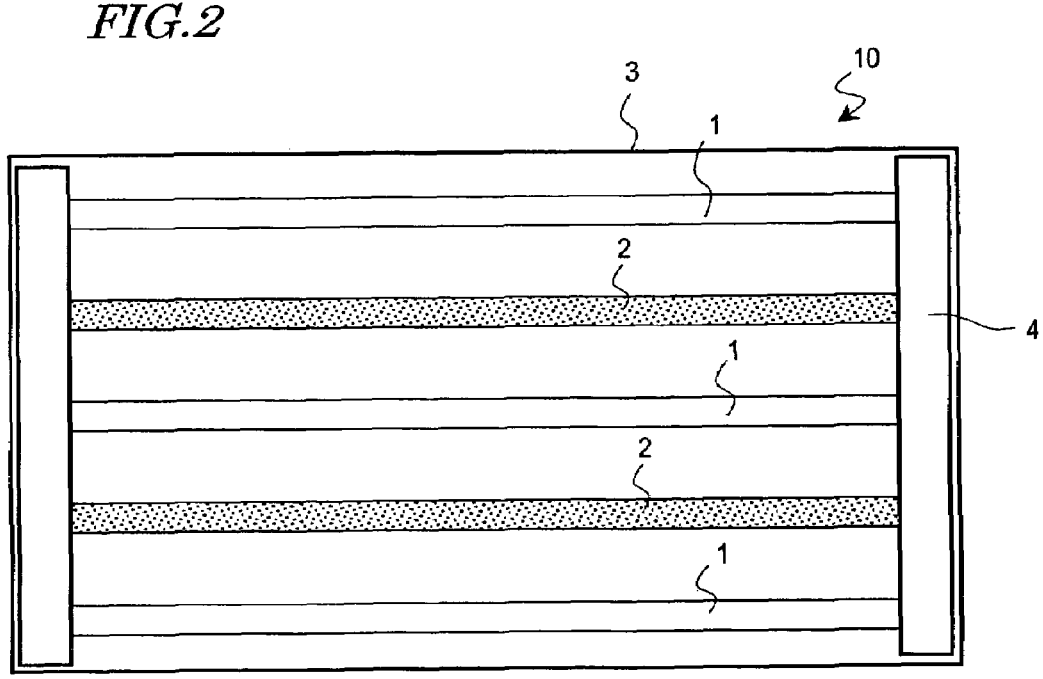
FIG. 2 is a plan view schematically illustrating the illumination device 10 according to the present invention.

With reference to FIGS. 1 and 2, an illumination device 10 according to a first preferred embodiment of the present invention will be described. FIG. 1 is a cross-sectional view schematically illustrating a liquid crystal display apparatus 30 including the illumination device 10, and FIG. 2 is a plan view schematically illustrating the illumination device 10.

As shown in FIG. 1, the illumination device 10 is a so-called backlight which is located on a rear side (opposite from the observer) of a liquid crystal display panel 20 included in the liquid crystal display apparatus 30. The liquid crystal display panel 20 includes a pair of substrates (for example, glass substrates) 21 and 22 and a liquid crystal layer 23 provided between the pair of substrates 21 and 22. The liquid crystal display panel 20 displays images by modulating light from the illumination device 10. The liquid crystal display panel 20 has an area for displaying images in a transmission mode in each of a plurality of pixels. Namely, the liquid crystal display panel 20 is a transmissive or transflective liquid crystal display panel.

As shown in FIGS. 1 and 2, the illumination device 10 includes a plurality of rod-like light sources 1 arranged substantially parallel to each other. In this preferred embodiment, the rod-like light sources 1 are cold cathode fluorescent tubes (CCFTs).

As shown in FIG. 2, the rod-like light sources 1 are held in a case 3 by a holder 4 provided in the case 3. As shown in FIG. 1, an optical sheet 5 is provided between the rod-like light sources 1 and the liquid crystal display panel 20. The optical sheet 5 is, for example, a diffusion sheet or a prism sheet. Although FIG. 1 shows the optical sheet 5 as a single element, an appropriate combination of diffusion sheet(s) and prism sheet(s) is used as the optical sheet 5 in actuality. Typically, in order to enhance the utilization factor of light, a highly light-reflective member (for example, a light-reflective sheet) is provided on an inner surface of the case 3 facing the rod-like light sources 1, or the case 3 itself is formed of a highly light-reflective material.

The illumination device 10 further includes a light scattering member 2 for scattering light, which is provided between two adjacent rod-like light sources 1. In this preferred embodiment, the light scattering member 2 is also rod-like, and is located at substantially the middle between the two adjacent rod-like light sources 1, substantially parallel to the rod-like light sources 1. The light scattering members 2 are held in the case 3 by the holder 4, like the rod-like light sources 1.

The illumination device 10 according to the present invention operates as follows. The light scattering member 2 is located between two adjacent rod-like light sources 1 as described above. Therefore, light emitted by the rod-like light sources 1 is partially scattered by the light scattering members 2. This increases the intensity of the light which goes out from areas of the illumination device 10 corresponding to regions between the rod-like light sources 1. As a result, the degree of unevenness of luminance can be decreased. The light scattering members 2 between the rod-like light sources 1 scatter the light substantially omnidirectionally. Therefore, in addition to increasing the intensity of the light from the areas of the illumination device 10 corresponding to the regions between the rod-like light sources 1, the light scattering members 2 act as pseudo light sources. Thus, an optical system, which is equivalent to an optical system including a larger number of rod-like light sources 1 arranged at a shorter interval, can be realized. Such an optical system decreases the degree of unevenness of luminance (brightness) both in the front direction (i.e., the direction normal to the display screen of the liquid crystal display apparatus 30) and in the oblique directions (i.e., directions angled with respect to the direction normal to the display screen of the liquid crystal display apparatus 30).

Figure 3:
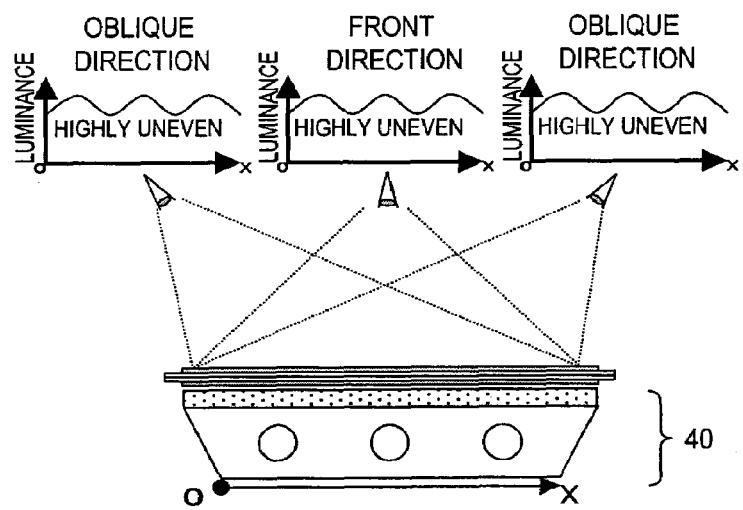
FIG. 3 is a view schematically illustrating how uneven luminance is caused in a conventional direct-type backlight.
Figure 4:
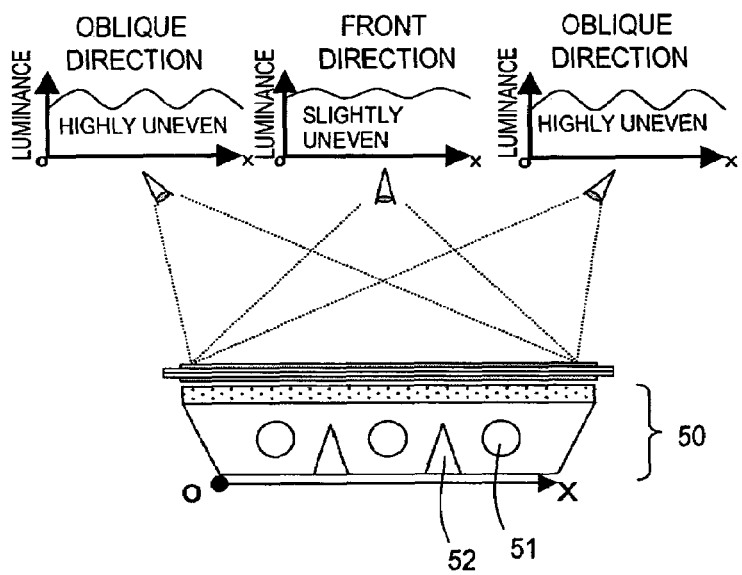
FIG. 4 is a view schematically illustrating how uneven luminance is caused in another conventional direct-type backlight.
Figure 5:
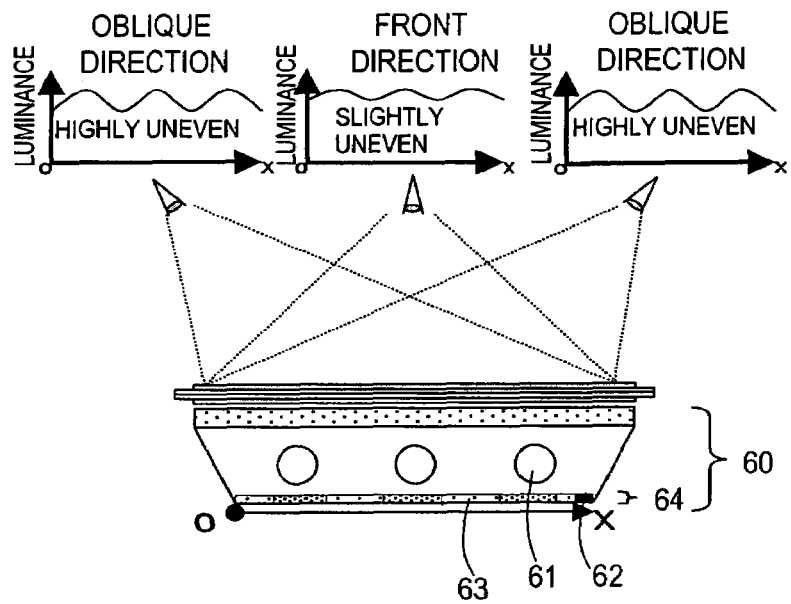
FIG. 5 is a view schematically illustrating how uneven luminance is caused in still another conventional direct-type backlight.
Figure 6:
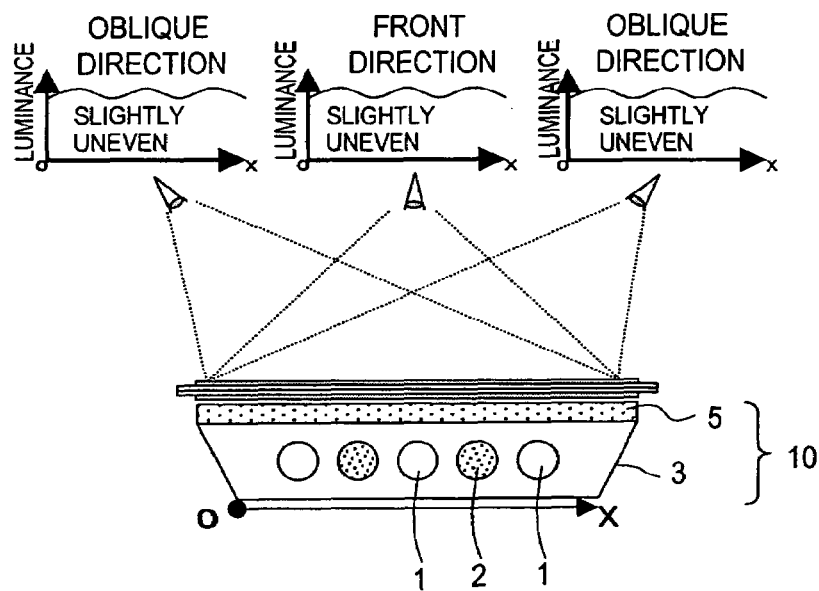
FIG. 6 is a view schematically illustrating how the unevenness of luminance is suppressed by the illumination device 10 according to the present invention.

FIGS. 3 through 5 show how uneven luminance is caused by the conventional direct-type backlights, and FIG. 6 shows how the unevenness of luminance is suppressed by the illumination device 10 according to the present invention.

As shown in FIG. 3, with the conventional, general direct-type backlight 40, the degree of unevenness of luminance is high both in the front direction and in the oblique directions. Thus, the backlight 40 lowers the display quality of the display apparatus including the backlight 40.

As shown in FIG. 4, the backlight 50 disclosed in Japanese Laid-Open Patent Publication No. 2002-122863 includes the light-reflective projections 52 provided between the light sources 51. Owing to this structure, the intensity of light going out from the areas of the backlight 50 corresponding to regions between the light sources 51 is increased. As a result, the degree of unevenness of luminance is decreased in the front direction. However, whereas the light scattering members 2 in this preferred embodiment scatter light substantially omnidirectionally, the light-reflective projections 52 having a triangular cross-section do not act as pseudo light sources. Therefore, the backlight 50 cannot sufficiently suppress the unevenness of luminance in the oblique directions, and thus cannot sufficiently improve the display quality of the display apparatus including the backlight 50.

As shown in FIG. 5, the backlight 60 disclosed in Japanese Laid-Open Patent Publication No. 2000-310776 includes the assisting light source 64 below the light sources 61. In addition, the scattering dot pattern of the lightguide plate 63 of the assisting light source 64 is formed such that the dots are sparse in the areas right below the light sources 61 and dense in the areas corresponding to the regions between the light sources 61. Owing to this structure, the intensity of light going out from the areas of the backlight 60 corresponding to the regions between the light sources 61 is increased. As a result, the degree of unevenness of luminance is decreased in the front direction. However, the assisting light source 64 is located below, not between, the light sources 61 and provides planar light emission. Thus, the assisting light source 64 cannot act as a pseudo light source, namely, cannot operate like the rod-like light sources 61. Therefore, the backlight 60 cannot sufficiently suppress the unevenness of luminance in the oblique directions, and thus cannot sufficiently improve the display quality of the display apparatus including the backlight 60.

As shown in FIG. 6, the illumination device 10 according to the present invention includes the light scattering members 2 each between two adjacent rod-like light sources 1, and the light scattering members 2 act as pseudo light sources. With this structure, the illumination device 10 can decrease the degree of unevenness of luminance both in the front direction and in the oblique directions. Therefore, the display apparatus including the illumination device 10 can provide high quality display. In addition, since the light scattering members 2 act as pseudo light sources, the distance between the liquid crystal display panel 20 and the rod-like light sources 1 (corresponding to distance A in FIG. 11) can be made shorter without increasing the number of the rod-like light sources 1. Thus, the illumination device 10 is usable for thinner designs and enjoys a high product value and low production cost.

Figure 7A:
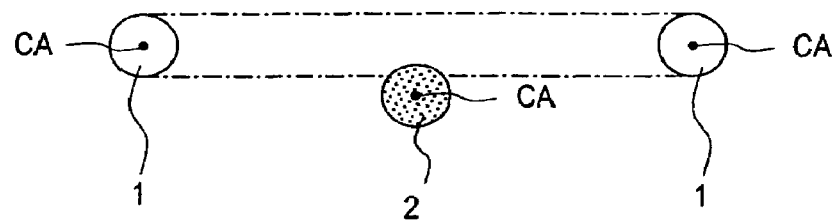
FIGS. 7A, 7B and 7C show exemplary positions of a light scattering member used in the illumination device 10 according to the present invention.
Figure 7B:
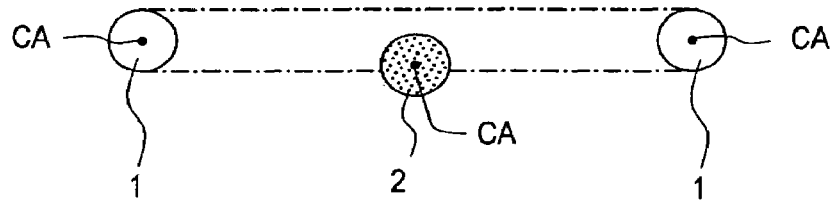
Figure 7C:
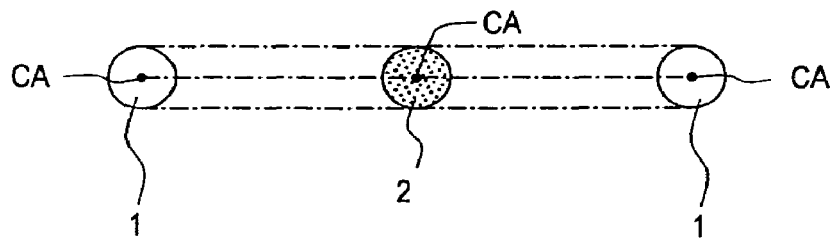

As described above, in the illumination device 10 according to the present invention, the light scattering members 2 for scattering light are located in consideration of two-dimensional positional relationship with, and also three-dimensional positional relationship with, the rod-like light sources 1. Thus, the light scattering members 2 act as pseudo optical sources. The light scattering members 2 are located "between" the rod-like light sources 1 when seen in the direction normal to the display screen as in FIG. 2, and are also located "between" the rod-like light sources 1 when seen in the longitudinal direction of the rod-like light sources 1 as in FIG. 1. The expression that "the light scattering members 2 are located 'between' the rod-like light sources 1 when seen in the longitudinal direction of the rod-like light sources 1" means the following: as shown in FIGS. 7A through 7C, each light scattering member 2 is located such that at least a part thereof is encompassed in a space defined between two rod-like light sources 1 (in a space defined by the two rod-like light sources 1 and the chain lines). In order to minimize the degree of unevenness of luminance when seen in the oblique directions, it is preferable that, as shown in FIG. 7B, central axis CA (phantom axis) of the light scattering member 2 is encompassed in the space defined between the two rod-like light sources 1. It is more preferable that, as shown in FIG. 7C, central axis CA of the light scattering member 2 is substantially in the same plane (i.e., is substantially at the same height) with central axes CA of the two rod-like light sources 1.

In order to allow the light scattering members 2 to preferably act as the pseudo optical sources, it is preferable that the light scattering members 2 have light distribution characteristics close to those of the rod-like light sources 1. To realize this, it is preferable that the light scattering members 2 are rod-like and the rod-like light scattering members 2 are located substantially parallel to the rod-like light sources 1 as in this preferred embodiment. It is also preferable that the rod-like light scattering members 2 have substantially the same outer diameter as that of the rod-like light sources 1.

Figure 8A:
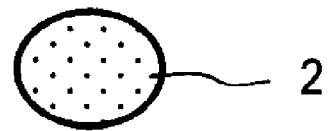
FIGS. 8A, 8B, 8C, 8D and 8E show exemplary shapes of a cross-section of the light scattering member used in the illumination device 10 according to the present invention, the cross-section being vertical to the longitudinal direction of the light scattering member.
Figure 8B:
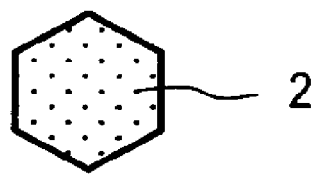
Figure 8C:
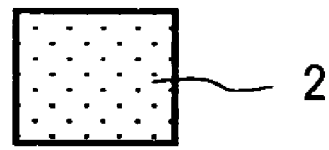
Figure 8D:
Figure 8E:
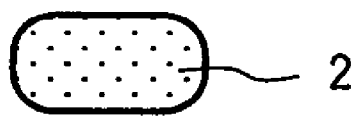

In this preferred embodiment, the light scattering members 2 are cylindrical and have a generally circular cross-section vertical to the longitudinal direction thereof. The cross-section of the light scattering members 2 is not limited to this. The cross-section of the light scattering members 2 vertical to the longitudinal direction thereof may be generally circular as shown in FIG. 8A, generally regularly polygonal as shown in FIG. 8B, quadrangular as shown in FIG. 8C, elliptical as shown in FIG. 8D, or generally quadrangular with rounded corners as shown in FIG. 8E. In order to realize the light distribution characteristics close to those of the rod-like light sources 1, it is preferable that the cross-section of the light scattering members 2 vertical to the longitudinal direction thereof has substantially the same shape as that of the cross-section of the rod-like light sources 1 vertical to the longitudinal direction thereof. A majority of generally used rod-like light sources such as cold cathode fluorescent tubes have a generally circular cross-section. In consideration of this, it is preferable that the cross-section of the light scattering members 2 vertical to the longitudinal direction thereof is generally circular.

In this preferred embodiment, one light scattering member 2 is located between two adjacent rod-like light sources 1. Alternatively, a plurality of light scattering members 2 may be located between two adjacent rod-like light sources 1. In the case where one light scattering member 2 is located between two adjacent rod-like light sources 1 as in this preferred embodiment, the light scattering member 2 is preferably located at substantially the middle between the two rod-like light sources 1. Such an arrangement is highly effective in suppressing the unevenness of luminance.

The light scattering members 2 may include a matrix formed of a resin material and particles dispersed in the matrix. The resin material and the particles have different refractive indices from each other. The resin material maybe, for example, an acrylic resin, and the particles may be, for example, silica beads. Instead of such an internally scattering-type light scattering member, a light scattering member having a scattering surface (for example, a surface which is rugged at a very fine level) may be used. Alternatively, a surface of an internally scattering-type light scattering member may be provided with a scattering property.

The scattering degree of the light scattering members 2 is defined by, for example, the Haze value. An appropriate specific Haze value of the light scattering members 2 may be determined in accordance with, for example, the number of the rod-like light sources 1, the distance between the rod-like light sources 1, and the luminance of each rod-like light source 1.

Figure 9:
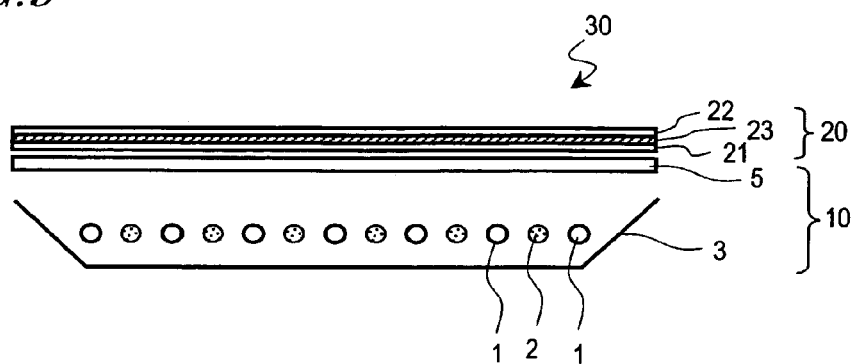
FIG. 9 is a cross-sectional view schematically illustrating a liquid crystal display apparatus 30 including a modified example of the illumination device 10 according to the present invention.
Figure 10:
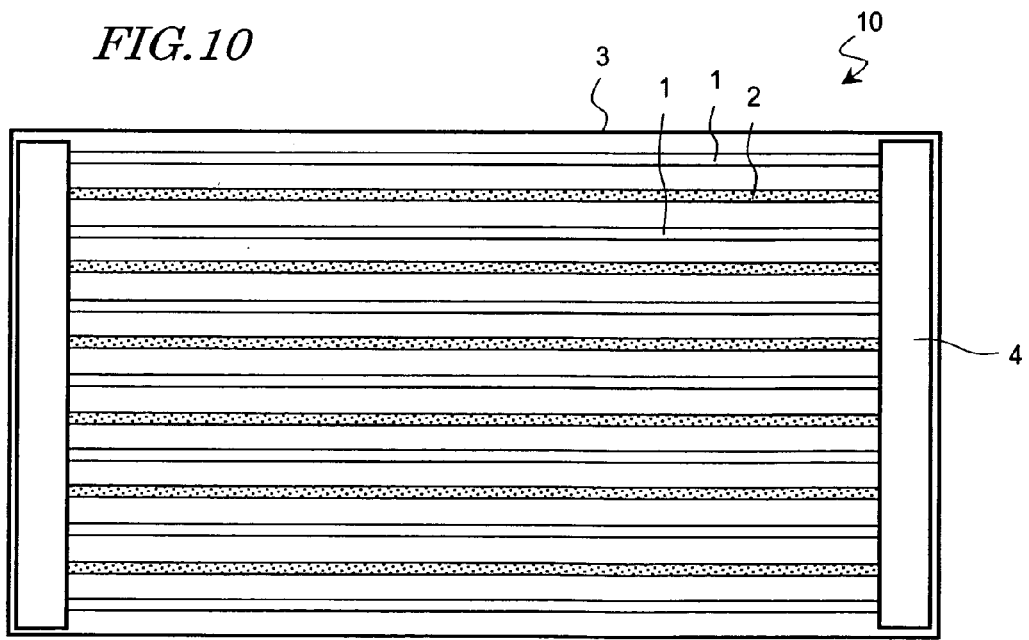
FIG. 10 is a plan view schematically illustrating the modified example of the illumination device 10 shown in FIG. 9 according to the present invention.

FIGS. 1 and 2 show three rod-like light sources 1 for the sake of simplicity. The number of the rod-like light sources 1 is not limited to three. As shown in FIGS. 9 and 10, a larger number of rod-like light sources 1 may be provided.

Second Preferred Embodiment

Figure 11:
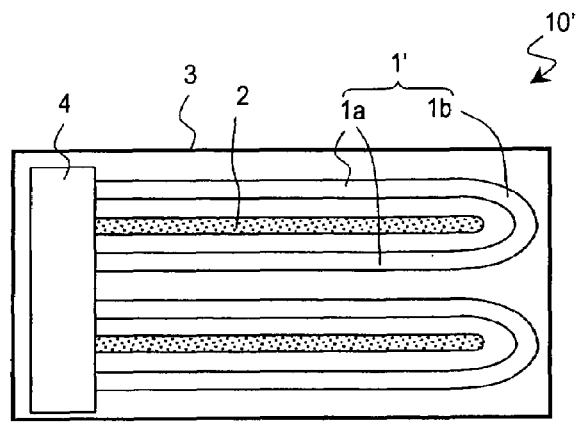
FIG. 11 is a plan view schematically illustrating another illumination device 10' according to the present invention.
Figure 12:
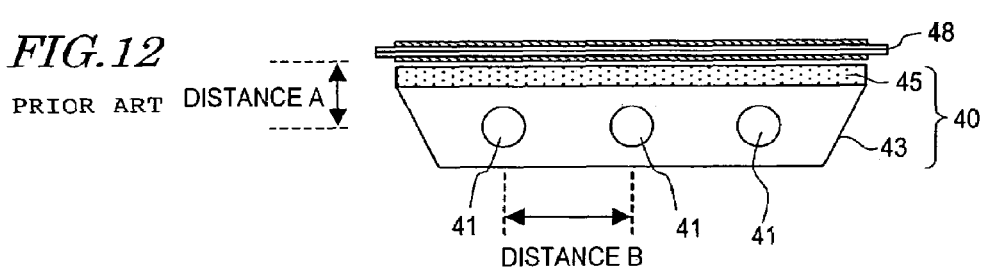
FIG. 12 is a cross-sectional view schematically illustrating a conventional, general direct-type backlight.
Figure 13:
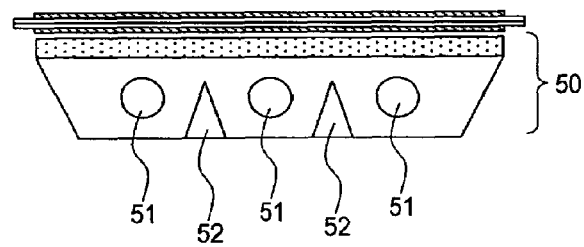
FIG. 13 is a cross-sectional view schematically illustrating a conventional direct-type backlight.
Figure 14:
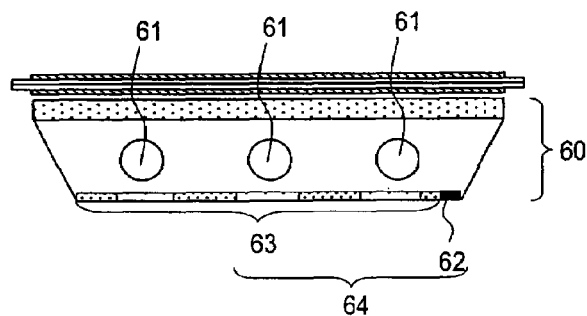
FIG. 14 is a cross-sectional view schematically illustrating another conventional direct-type backlight.

With reference to FIG. 11, an illumination device 10' according to a second preferred embodiment of the present invention will be described. The illumination device 10' is also a backlight which is located on a rear side (opposite from the observer) of a liquid crystal display panel. Hereinafter, the illumination device 10' will be described mainly regarding the points which are different from those of the illumination device 10 in the first preferred embodiment.

As shown in FIG. 11, the illumination device 10' includes at least one U-shaped light source 1' (FIG. 11 shows two U-shaped light sources 1'). Each U-shaped light source 1' includes two rod-like sections (rod-like light emitting sections) 1a located parallel to each other and a bent section 1b for connecting the two rod-like sections 1a. The U-shaped light source 1' in this preferred embodiment is a cold cathode fluorescent tube.

The illumination device 10' further includes a light scattering member 2 for scattering light, which is provided between the two adjacent rod-like sections 1a. In this preferred embodiment, the light scattering member 2 is rod-like, and is located at substantially the middle between, and substantially parallel to, the two adjacent rod-like sections 1a.

The light sources 1' and the light scattering members 2 are held in a case 3 by a holder 4 provided in the case 3. Although not shown, an optical sheet is optionally provided at a position closer to the observer than the light sources 1' and the light scattering members 2.

In the illumination device 10' in this preferred embodiment also, the light scattering member 2 located between the two adjacent rod-like sections 1a acts as a pseudo light source. Therefore, an optical system, which is equivalent to an optical system including a larger number of rod-like sections 1a of the U-shaped light sources 1' at a shorter interval, can be realized. Such an optical system decreases the degree of unevenness of luminance both in the front direction and in the oblique directions.

Preferable shapes and locations of the light scattering members 2 in this preferred embodiment are substantially the same as those of the light scattering members 2 in the first preferred embodiment. Specifically, in order to minimize the degree of unevenness of luminance when seen in the oblique directions, it is preferable that the central axis (phantom axis) of the light scattering member 2 is encompassed in a space defined between the two rod-like sections 1a (as in FIG. 7B). It is more preferable that the central axis of the light scattering member 2 is substantially in the same plane (i.e., is substantially at the same height) with the central axes of the two rod-like sections 1a (as in FIG. 7C).

In order to allow the light scattering members 2 to preferably act as the pseudo optical sources, it is preferable that the light scattering members 2 have light distribution characteristics close to those of the rod-like sections 1a. To realize this, it is preferable that the light scattering members 2 are rod-like and the rod-like light scattering members 2 are located substantially parallel to the rod-like sections 1a as in this preferred embodiment. It is also preferable that the rod-like light scattering members 2 have substantially the same outer diameter as that of the rod-like sections 1a. It is preferable that the cross-section of the light scattering members 2 vertical to the longitudinal direction thereof has substantially the same shape as that of the cross-section of the rod-like sections 1a vertical to the longitudinal direction thereof. A majority of generally used rod-like light sources such as cold cathode fluorescent tubes have a generally circular cross-section. In consideration of this, it is preferable that the cross-section of the light scattering members 2 vertical to the longitudinal direction thereof is generally circular.

In the case where one light scattering member 2 is located between two rod-like sections 1a as in this preferred embodiment, the light scattering member 2 is preferably located at substantially the middle between the two rod-like sections 1a.

In this preferred embodiment, the illumination device 10' includes U-shaped light sources 1' each including two rod-like sections 1a and one bent section 1b. Instead of the U-shaped light sources 1', a light source having a larger number of rod-like sections and bent sections maybe used. For example, a W-shaped light source including four rod-like sections and three bent sections may be used. In the case where light sources each including a plurality of rod-like sections and bent sections each for connecting two adjacent rod-like sections are used, the number of the light sources can be decreased and thus the production cost of the illumination device 10' and the display apparatus including the illumination device 10' can be reduced, as compared to the case where rod-like light sources are used.

The present invention provides an illumination device capable of sufficiently suppressing the unevenness of luminance and preferably usable as a direct-type backlight, and a display apparatus including such an illumination device.

This non-provisional application claims priority under 35 USC §119(a) on Patent Application Ser. No. 2003-388205 filed in Japan on Nov. 18, 2003, the entire contents of which are hereby incorporated by reference.

What is claimed is:

1. An illumination device for a display apparatus provided on a rear side of a display panel of the display apparatus, the illumination device comprising:
   a plurality of rod-like light sources arranged substantially parallel to each other;
   a light scattering member for scattering light, the light scattering member being provided between two adjacent rod-like light sources among the plurality of rod-like light sources; and
   a light reflective case arranged directly behind the plurality of rod-like light sources and the light scattering member, the light reflective case being arranged to reflect light from the plurality of rod-like light sources; wherein
   the light scattering member includes a rugged scattering surface; and
   the light scattering member is a separate member from the light reflective case such that no surface of the light scattering member is in contact with the light reflective case.

2. An illumination device according to claim 1, wherein the light scattering member is located at substantially the middle between the two adjacent rod-like light sources.

3. An illumination device according to claim 1, wherein the light scattering member is rod-like.

4. An illumination device according to claim 3, wherein the light scattering member is located substantially parallel to the plurality of rod-like light sources.

5. An illumination device according to claim 3, wherein the central axis of the light scattering member is located substantially in the same plane as the central axes of the plurality of rod-like light sources.

6. An illumination device for a display apparatus provided on a rear side of a display panel of the display apparatus, the illumination device comprising:
   a plurality of rod-like light sources arranged substantially parallel to each other; and
   a light scattering member for scattering light, the light scattering member being provided between two adjacent rod-like light sources among the plurality of rod-like light sources; wherein
   the light scattering member includes a rugged scattering surface;
   the light scattering member is rod-like; and
   the light scattering member has substantially the same outer diameter as the outer diameter of each of the plurality of rod-like light sources.

7. An illumination device for a display apparatus provided on a rear side of a display panel of the display apparatus, the illumination device comprising:
   a plurality of rod-like light sources arranged substantially parallel to each other; and
   a light scattering member for scattering light, the light scattering member being provided between two adjacent rod-like light sources among the plurality of rod-like light sources; wherein
   the light scattering member is rod-like and includes a rugged scattering surface;
   the light scattering member is rod-like; and
   a cross-section of the light scattering member which is vertical to a longitudinal direction thereof has substantially the same shape as the shape of a cross-section of each of the plurality of rod-like light sources which is vertical to a longitudinal direction thereof.

8. An illumination device according to claim 3, wherein a cross-section of the light scattering member which is vertical to a longitudinal direction thereof is generally circular.

9. An illumination device according to claim 1, wherein each of the plurality of rod-like light sources is a fluorescent tube.

10. An illumination device for a display apparatus provided on a rear side of a display panel of the display apparatus, the illumination device comprising:
    at least one light source including a plurality of rod-like sections arranged substantially parallel to each other and a bent section for connecting two adjacent rod-like sections among the plurality of rod-like sections; a light scattering member for scattering light, the light scattering member being provided between two adjacent rod-like sections among the plurality of rod-like sections; and
    a light reflective case arranged directly behind the at least one light source and the light scattering member, the light reflective case being arranged to reflect light from the at least one light source; wherein
    the light scattering member includes a rugged scattering surface; and
    the light scattering member is a separate member from the light reflective case such that no surface of the light scattering member is in contact with the light reflective case.

11. An illumination device according to claim 10, wherein the light scattering member is located at substantially the middle between the two adjacent rod-like sections.

12. An illumination device according to claim 10, wherein the light scattering member is rod-like.

13. An illumination device according to claim 12, wherein the light scattering member is located substantially parallel to the plurality of rod-like sections.

14. An illumination device according to claim 12, wherein the central axis of the light scattering member is located substantially in the same plane as the central axes of the plurality of rod-like sections.

15. An illumination device for a display apparatus provided on a rear side of a display panel of the display apparatus, the illumination device comprising:
    at least one light source including a plurality of rod-like sections arranged substantially parallel to each other and a bent section for connecting two adjacent rod-like sections among the plurality of rod-like sections; and
    a light scattering member for scattering light, the light scattering member being provided between two adjacent rod-like sections among the plurality of rod-like sections; wherein
    the light scattering member includes a rugged scattering surface;
    the light scattering member is rod-like; and
    the light scattering member has substantially the same outer diameter as the outer diameter of each of the plurality of rod-like sections.

16. An illumination device for a display apparatus provided on a rear side of a display panel of the display apparatus, the illumination device comprising:
    at least one light source including a plurality of rod-like sections arranged substantially parallel to each other and a bent section for connecting two adjacent rod-like sections among the plurality of rod-like sections; and
    a light scattering member for scattering light, the light scattering member being provided between two adjacent rod-like sections among the plurality of rod-like sections; wherein
    the light scattering member includes a rugged scattering surface;
    the light scattering member is rod-like; and
    a cross-section of the light scattering member which is vertical to a longitudinal direction thereof has substantially the same shape as the shape of a cross-section of each of the plurality of rod-like sections which is vertical to a longitudinal direction thereof.

17. An illumination device according to claim 12, wherein a cross-section of the light scattering member which is vertical to a longitudinal direction thereof is generally circular.

18. An illumination device according to claim 10, wherein the at least one light source is at least one fluorescent tube.

19. A display apparatus, comprising:
    a display panel for performing display by modulating light; and
    an illumination device according to claim 1 which is provided at a rear side of the display panel.

20. A display apparatus according to claim 19, wherein the display panel is a liquid crystal display panel including a pair of substrates and a liquid crystal layer provided between the pair of substrates.

21. A display apparatus, comprising:
    a display panel for performing display by modulating light; and
    an illumination device according to claim 10 which is provided at a rear side of the display panel.

22. A display apparatus according to claim 21, wherein the display panel is a liquid crystal display panel including a pair of substrates and a liquid crystal layer provided between the pair of substrates.

* * * * *